United States Patent [19]

Pedersen

[11] 3,878,526

[45] Apr. 15, 1975

[54] DOPPLER SIGNAL PROCESSOR USING QUADRATURE REFERENCE SIGNALS

[75] Inventor: Norman E. Pedersen, Wilmington, Mass.

[73] Assignee: Panametrics, Inc., Waltham, Mass.

[22] Filed: June 29, 1973

[21] Appl. No.: 375,041

[52] U.S. Cl. .................................................. 343/7.7
[51] Int. Cl. ............................................... G01s 9/42
[58] Field of Search .................................... 343/7.7

[56] References Cited
UNITED STATES PATENTS
3,696,417  10/1972  Pederson ........................... 343/7.7

*Primary Examiner*—T. H. Tubbesing
*Attorney, Agent, or Firm*—Kenway & Jenney

[57] ABSTRACT

In the signal processor disclosed herein, an echo signal reflected back from an environment in response to a radiated signal is demodulated both with respect to a first reference signal derived from the radiated signal and a second reference signal which is in phase quadrature with the first reference signal to obtain respective Doppler information signals. Each of the information signals is differentiated and each differentiated signal is combined in a multiplier with the other undifferentiated Doppler information signal. The sum of the two resultant product signals is then integrated to obtain a signal representative of net target movement.

4 Claims, 1 Drawing Figure

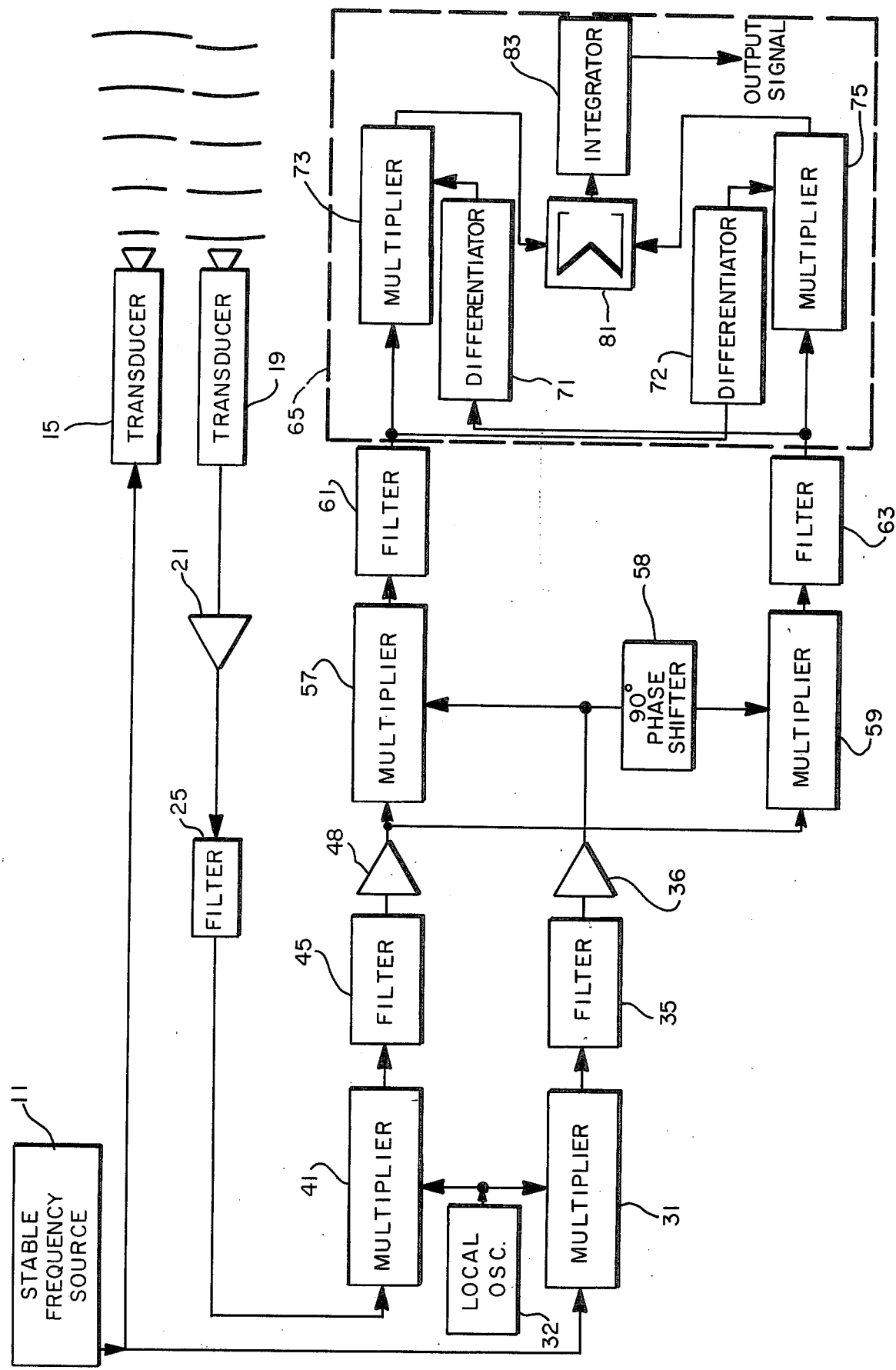

DOPPLER SIGNAL PROCESSOR USING QUADRATURE REFERENCE SIGNALS

BACKGROUND OF THE INVENTION

This invention is an improvement and further embodiment of the signal processor disclosed in application Ser. No. 58,145, now U.S. Pat. No. 3,696,417. The invention relates to a signal processor and more particularly to apparatus for processing Doppler shifted echo signals.

The earlier application identified above discloses a twofrequency moving target indicator which employs coherent detection of the echo signals corresponding to each of a pair of radiated signals of different frequencies to obtain respective Doppler information signals. Each of these Doppler information signals is then differentiated and combined in a multiplier with the undifferentiated version of the other of the pair of Doppler information signals. Summing the respective product signals and integrating yields a signal which is a function of net target displacement and is relatively insensitive to moving clutter which does not undergo a substantial net displacement.

While the two-frequency system provides substantial advantages and is singularly effective in discriminating against interfreence and intentional jamming, certain of the advantages of the two-frequency system can be obtained in a somewhat simpler, single-frequency system employing a related type of signal processing.

SUMMARY OF THE INVENTION

Briefly, apparatus of the present invention is operative to process the Doppler shifted components of an echo signal reflected back from an environment in response to a radiated signal. The echo signal is demodulated with respect to both a first reference signal which is derived from the radiated signal and also a second reference signal which is in phase quadrature with the first reference signal, thereby yielding respective Doppler information signals. Each of the Doppler information signals is then differentiated and each differentiated signal is combined in a multiplier with the undifferentiated version of the other of the Doppler information signals to obtain respective product signals. An output signal is then generated having an amplitude which varies as a function of the time integral of the difference between the amplitudes of the two product signals.

While quadrature detection of Doppler shifted echo signals is per se known in the art, e.g. as in the system disclosed by Henry P. Kalmus in his U.S. Pat. No. 3,432,855 and in an article in the supplement to AIEE Transactions on Aerospace and Electronic Systems, Vol. AES-3, No. 6, November 1967, the system of the present invention is advantageous in that it generates a signal which is essentially a function of the net movement of a target independent of velocity, whereas the prior art systems tend to be velocity-dependent. Thus, whereas the prior art systems will tend to reject clutter due to points having symmetrical motions, the apparatus of the present invention discriminates highly against clutter points moving in virtually any reciprocal motion irrespective of changing velocity.

Brief Description of the Drawing

The single drawing is a block diagram of an echo target sensing system according to the present invention.

Description of the Preferred Embodiment

In the drawing, a stable frequency source is indicated generally at 11. Source 11 is assumed to provide a signal at a selected frequency, designated $\omega_1$. This signal is applied to a suitable transducer 15 for radiating energy at the selected frequency into an environment in which it is desired to detect moving targets. In the case of radar applications, the transducer 15 may comprise suitable r.f. power amplifiers and an antenna, while in sonar applications, the transducer may comprise a loudspeaker or other electro-acoustic transducer.

Objects or targets in the environment will reflect a portion of the radiated energy back to the apparatus where it is picked up by a suitable transducer, as indicated at 19. As the echo signals received will typically be of relatively small amplitude, these received signals are passed through a preamplifier, as indicated at 21, and a filter 25 so as to be selectively amplified to a level suitable for intermediate processing to extract the Doppler information contained. While, in the embodiment illustrated, the transmission and reception have been illustrated as being performed by separate transducers for the purpose of simplicity of explanation, it will be understood by those skilled in the art that a single transducer or antenna may be used by employing a suitable circulator or other isolation element to prevent an excess of the transmitted power from being introduced directly into the receiver system. Similarly, as means for transmitting interrogating energy and receiving corresponding echo signals are well known in the art, such means are not described in detail but are described only insofar as is necessary for an understanding of the signal processing apparatus of the present invention.

As will be understood by those skilled in the art, reflection from the environment will produce echo signals, typically comprising a substantial component at the original transmitted frequency, i.e., energy reflected back from stationary objects, plus a plurality of Doppler-shifted components, i.e., energy reflected back from moving objects or targets. Since the reflecting objects may be moving either toward or away from the apparatus, the Doppler components may be either above or below the respective original transmitted frequency.

A coherent sample of the transmitted frequency $\omega_1$, obtained from the source 11, is applied to a multiplier circuit 31 together with a signal obtained from a local oscillator 32 so as to obtain a product signal including a component at a frequency which is equal to the difference in frequency between the two signals applied to multiplier 31. As is apparent hereinafter, this difference frequency may be considered to be the i.f. (intermediate frequency) of the system. The product signal is applied to a filter 35 which extracts the difference frequency component and the extracted component is amplified as indicated at 36.

The signal obtained from the local oscillator 32 is also applied to a multiplier circuit 41 where it is combined with or multiplied by the echo signal. As is understood, the product signal so generated will include a set of frequency components centered nominally on the difference between the transmitted and the local oscillator frequencies, i.e., the i.f. frequency. The product signal obtained from the multiplier 41 is applied to a filter, as indicated at 45, where the i.f. frequency components are separated out and these separated i.f. components are amplified as indicated at 48. The filter 45, like the filter 35, is centered on the difference frequency but has bandwidth sufficient to pass Doppler components separated from the i.f. frequency by the amount of the Doppler shifts.

The substantially pure difference frequency signal obtained from the filter 35 is employed to synchronously detect or demodulate the echo signals, both in original phase and in phasequadrature. For this purpose, the difference frequency signal is applied directly to one input of a multiplier circuit 57 and, through a 90° phase shifter 58, to one input of a multiplier circuit 59. The echo signal, shifted to the difference or i.f. frequency, is applied to the other input of both multipliers.

The product signals obtained from the multipliers 57 and 59 are applied to respective low pass filters 61 and 63 to elmininate components around the i.f. frequency. The signals remaining after such filtering may be considered to be Doppler information signals. Each such Doppler information signal comprises components which are equal in frequency to the Doppler shift of the Doppler-shifted components in the original set of echo signals. In other words, the Doppler components in the original echo signals have, in effect, been synchronously transposed or heterodyned down to a zero i.f. frequency. These Doppler information signals are applied to a signal processor, designated generally as 65. In some applications it may be desirable to reduce the dynamic range of the input signals applied to the processor, e.g. by applying a normalizing function, so that the range over which the processor must operate is reduced. Accordingly, as used herein, the term Doppler information signal should be understood to encompass a processor input signal which has been normalized in amplitude as well as one which has not.

In the signal processor 65, each Doppler information signal is applied to a respective differentiator circuit 71 and 72 which provides an output signal which is a differentiated version of the original Doppler information signal. In other words, a time-amplitude dependent transformation function is applied to the Doppler information signal. Each differentiated Doppler information signal is applied to one input of a respective multiplier circuit 73 and 75. To the remaining input terminal of each multiplier is applied the other or opposite Doppler information signal in undifferentiated form. In other words, there is a cross-combining of information obtained from the quadrature-detected echo signals. In the embodiment illustrated, the undifferentiated information signal is obtained directly from the input to the signal processor but essentially the same information can also be obtained by integrating the previously differentiated signal. This latter method blocks extraneous d.c. level shifts.

The output signals from the two multipliers 73 and 75 are applied, respectively, to the in-phase and inverting inputs of a summing circuit, e.g. a differential amplifier, as indicated at 81. The output signal from the summing circuit is in turn applied to the input terminal of an integrator circuit 83. The time constant of integrator 83 is selected so as to be long in relation to the expected periods of movement of the clutter points.

It can be shown that the presence of a single target moving at a constant radial velocity would produce, at the integrator 83, an output voltage which changes at a rate corresponding to the velocity of the target. If the response of the overall system is confined to a particular zone, e.g. by range gating as is known in the art, the output signal may effectively be treated as a d.c. signal having an amplitude which varies as a target moves through the zone. Alternatively, the output signal from the signal processor 65 can, for example, be subjected to analysis in order to separate out components due to targets having different radial velocities or, for intrusion detection systems, the output signal may merely be applied to an amplitude threshold circuit which controls an alarm. Further, the processor output signal may be subjected to further processing as being merely part of the information collected by a larger echo interrogation system of which the present apparatus is a component.

In view of the foregoing, it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. Apparatus for processing the Doppler shifted components of echo signals reflected back from an environment in response to a radiated signal, said apparatus comprising:

means for generating a first Doppler information signal using a first reference signal which is derived from the radiated signal;

means providing a second reference signal which is in phase quadrature with said first reference signal;

means for generating a second Doppler information signal using said second reference signal;

means for differentiating each of said Doppler information signals thereby to provide a respective differential signal;

means for generating a first product signal having an amplitude which is proportional to the product of the amplitude of a first of said Doppler information signals with the amplitude of the differential signal corresponding to the other of said Doppler information signals;

means for generating a second product signal having an amplitude which is proportional to the product of the amplitude of the other of said Doppler information signals with the amplitude of the differential signal corresponding to said first Doppler information signal; and means for generating an output signal having an amplitude which varies as a function of the time integral of the difference between the amplitudes of said product signals.

2. Apparatus as set forth in claim 1 wherein both means for generating product signals are analog multipliers.

3. Apparatus for processing the Doppler shifted components of an echo signal reflected back from an environment in response to a radiated signal, said apparatus comprising:

a local oscillator providing a signal of predetermined frequency;

means for combining a sample of said radiated signal with said local oscillator signal to obtain an intermediate frequency reference signal;

means for combining said echo signal with said local oscillator signal to obtain an intermediate frequency echo signal;

means for combining said intermediate frequency echo signal with said intermediate frequency reference signal to obtain a first Doppler information signal;

means for producing a relative phase shift between said intermediate frequency reference signal and said intermediate frequency echo signal, said relative phase shift being of essentially 90° at said intermediate frequency;

means for combining the relatively phase shifted intermediate frequency echo signal and reference signal to obtain a second Doppler information signal;

means for differentiating each of said Doppler information signals thereby to provide a respective differential signal;

means for generating a first product signal having an amplitude which is proportional to the product of the amplitude of a first of said Doppler information signals with the amplitude of the differential signal corresponding to the other of said Doppler information signals;

means for generating a second product signal having an amplitude which is proportional to the product of the amplitude of the other of said Doppler information signals with the amplitude of the differential signal corresponding to said first Doppler information signal; and means for generating an output signal having an amplitude which varies as a function of the time integral of the difference between the amplitudes of said product signals.

4. Apparatus as set forth in claim 3 wherein each of said combining means are analog multipliers.

* * * * *